United States Patent
Wang et al.

(10) Patent No.: US 11,161,421 B2
(45) Date of Patent: Nov. 2, 2021

(54) AUXILIARY WIRELESS POWER TRANSFER SYSTEM

(71) Applicant: Toyota Motor Engineering & Manufacturing North America, Inc., Erlanger, KY (US)

(72) Inventors: Chi-Ming Wang, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 213 days.

(21) Appl. No.: 15/690,136

(22) Filed: Aug. 29, 2017

(65) Prior Publication Data

US 2019/0061533 A1    Feb. 28, 2019

(51) Int. Cl.
| | | |
|---|---|---|
| *B60L 53/12* | (2019.01) | |
| *H02J 50/12* | (2016.01) | |
| *H02J 7/02* | (2016.01) | |
| *B60L 58/10* | (2019.01) | |
| *B60L 8/00* | (2006.01) | |
| *B60L 1/00* | (2006.01) | |

(52) U.S. Cl.
CPC ............... *B60L 53/12* (2019.02); *B60L 1/20* (2013.01); *B60L 8/003* (2013.01); *B60L 58/10* (2019.02); *H02J 7/025* (2013.01); *H02J 50/12* (2016.02)

(58) Field of Classification Search
CPC .... B60L 11/182; B60L 11/1851; B60L 53/12; B60L 8/003; B60L 1/20; B60L 58/10; H02J 7/025; H02J 50/12; Y02T 90/14; Y02T 10/70; Y02T 10/7072
See application file for complete search history.

(56) References Cited

U.S. PATENT DOCUMENTS

| | | | |
|---|---|---|---|
| 8,143,766 B2 | 3/2012 | Namuduri et al. | |
| 8,791,600 B2 | 7/2014 | Soar | |
| 9,067,484 B2 | 6/2015 | Zhao | |
| 10,471,838 B2 * | 11/2019 | Rajaie | B60L 53/16 |

(Continued)

FOREIGN PATENT DOCUMENTS

| | | |
|---|---|---|
| CN | 201901008 | 7/2011 |
| CN | 103490465 | 1/2014 |

(Continued)

*Primary Examiner* — Drew A Dunn
*Assistant Examiner* — Sailesh Thapa
(74) *Attorney, Agent, or Firm* — Snell & Wilmer LLP (57) ABSTRACT

Methods, systems, and apparatus for generating and storing electrical energy for a partially or fully electric vehicle having a motor/generator, the system includes an auxiliary power device configured to generate electrical energy by converting non-electrical energy into electrical energy. The system includes a transmitter connected to the auxiliary power device and configured to wirelessly transmit the electrical energy generated by the auxiliary power device. The system includes a battery configured to store electrical energy and power the motor/generator to propel the vehicle. The system includes a receiver connected to the battery and configured to receive electrical energy and charge the battery. The system includes a power bus configured to wirelessly receive the generated electrical energy from the transmitter and transmit the generated electrical energy to the receiver.

14 Claims, 9 Drawing Sheets

(56) References Cited

U.S. PATENT DOCUMENTS

| | | | |
|---|---|---|---|
| 2004/0119289 A1* | 6/2004 | Zabramny | H02J 7/32 |
| | | | 290/1 R |
| 2005/0228553 A1* | 10/2005 | Tryon | B60L 50/16 |
| | | | 701/22 |
| 2008/0054638 A1* | 3/2008 | Greene | H02J 7/025 |
| | | | 290/1 R |
| 2009/0283126 A1* | 11/2009 | Rostek | F01N 5/025 |
| | | | 136/203 |
| 2010/0006362 A1* | 1/2010 | Armstrong | B60G 17/015 |
| | | | 180/165 |
| 2011/0266801 A1* | 11/2011 | Sainio | B60G 13/02 |
| | | | 290/48 |
| 2012/0133334 A1 | 5/2012 | Lachenmeier et al. | |
| 2012/0313575 A1* | 12/2012 | Stansbury, III | B60K 25/10 |
| | | | 320/107 |
| 2013/0049677 A1* | 2/2013 | Bouman | B60L 11/185 |
| | | | 320/106 |
| 2013/0278201 A1 | 10/2013 | Retti | |
| 2015/0251539 A1 | 9/2015 | Sura et al. | |
| 2017/0008406 A1 | 1/2017 | Takatsu et al. | |
| 2017/0084817 A1 | 3/2017 | Navarro et al. | |
| 2017/0137028 A1* | 5/2017 | Amigo | B60K 17/24 |
| 2018/0281608 A1* | 10/2018 | Albanna | H02J 7/06 |

FOREIGN PATENT DOCUMENTS

| | | | | |
|---|---|---|---|---|
| CN | 104967190 | | 10/2015 | |
| DE | 102008019160 A1 | * | 10/2009 | F02G 5/02 |
| KR | 20010070710 A | * | 11/2001 | |
| KR | 101373561 B1 | * | 3/2014 | |
| KR | 2015093091 | | 8/2015 | |
| WO | WO-2006047926 A1 | * | 5/2006 | B60G 13/14 |
| WO | WO 2011/114942 | | 9/2011 | |
| WO | WO 2011/116394 | | 9/2011 | |
| WO | WO 2013/144250 | | 10/2013 | |

\* cited by examiner

AUXILIARY WIRELESS POWER TRANSFER SYSTEM

BACKGROUND

1. Field

This specification relates to a system and a method for generating and storing electrical energy for a fully electric or partially electric vehicle.

2. Description of the Related Art

Fully electric vehicles and partially electric vehicles (e.g., hybrid vehicles) may be charged at a charging station by connecting to an electrical outlet. The battery is charged and it is used to power a motor/generator. The battery may also be charged by a regenerative braking system. As the wheels of the vehicle turn, regenerative braking generates electricity from the turning of the axles connected to the wheels. The battery may also be charged by the engine powering the electric motor/generator to generate electricity. The battery may distribute the stored energy to various parts of the electric vehicle (e.g., the motor, an infotainment unit, or lights of the vehicle) via a system of wires carrying the electrical energy.

However, charging stations are sparsely located and require the electric vehicle to be stationary, and regenerative braking can only generate a limited amount of energy stored in a central battery. Other systems and methods are needed to increase the travel range of electric vehicles, decrease trip times due to stopping to charge the electric vehicle, and provide more flexible and efficient charging solutions.

SUMMARY

What is described is a system for generating and storing electrical energy for a partially or fully electric vehicle having a motor/generator. The system includes a shock absorber of the vehicle configured to absorb or dampen shock and having a piston moving about a cylinder. The system also includes a triboelectric generator connected to the piston and the cylinder of the shock absorber and configured to generate electrical energy by converting frictional or vibrational energy into electrical energy. The system also includes a transmitter coupled to the triboelectric generator and configured to wirelessly transmit the electrical energy generated by the triboelectric generator. The system also includes a battery configured to store electrical energy and power the motor/generator to propel the vehicle. The system also includes a receiver coupled to the battery and configured to receive electrical energy and charge the battery. The system also includes a power bus configured to wirelessly receive the generated electrical energy from the transmitter and transmit the generated electrical energy to the receiver.

Also described is a system for generating and storing electrical energy for a partially or fully electric vehicle having a motor/generator. The system includes a piezoelectric generator connected to a chassis of the vehicle and configured to generate electrical energy by converting deformation from mechanical stress into electrical energy. The system also includes a power transmitter configured to wirelessly transmit the electrical energy generated by the piezoelectric generator. The system also includes a battery configured to store electrical energy and power the motor/generator to propel the vehicle. The system also includes a receiver configured to receive electrical energy and charge the battery. The system also includes a power bus configured to wirelessly receive the generated electrical energy from the transmitter and transmit the generated electrical energy to the receiver.

Also described is a system for generating and storing electrical energy for a vehicle having a motor/generator and an engine. The system includes a vehicle exhaust pipe configured to guide exhaust gases away from the engine. The system also includes a thermal-electric generator connected to the vehicle exhaust pipe and configured to generate electrical energy by converting heat waste into electrical energy. The system also includes a power transmitter configured to wirelessly transmit the electrical energy generated by the thermal-electric generator. The system also includes a battery configured to store electrical energy and power the motor/generator to propel the vehicle. The system also includes a receiver configured to receive electrical energy and charge the battery. The system also includes a power bus configured to wirelessly receive the generated electrical energy from the transmitter and transmit the generated electrical energy to the receiver.

Also described is a system for generating and storing electrical energy for a partially or fully electric vehicle having a motor/generator. The system includes a solar generator connected to a roof of the vehicle and configured to generate electrical energy by converting solar energy into electrical energy. The system also includes a power transmitter configured to wirelessly transmit the electrical energy generated by the solar generator. The system also includes a battery configured to store electrical energy and power the motor/generator to propel the vehicle. The system also includes a receiver configured to receive electrical energy and charge the battery. The system also includes a power bus configured to wirelessly receive the generated electrical energy from the transmitter and transmit the generated electrical energy to the receiver.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for generating electrical energy for an electric vehicle using auxiliary power devices distributed throughout the vehicle, and wirelessly providing the electrical energy for storage in one or more batteries. Some electric vehicles use a significant amount of electrical power. Electrical powertrains may be approaching a plateau in terms of additional energy economy improvements from increasing efficiency in the electrical powertrains. Accordingly, alternate sources of energy may be considered for generating electrical energy to be used by electric vehicles. In addition, conventional methods of transmitting electrical power rely on wire conductors, which may be costly, fail, and consume space.

Charging stations require the electric vehicle to be stationary and charging station locations are sparsely located and may be subject to overcrowding by other electric vehicles. Current onboard charging methods and systems are not significant enough sources of power to extend a driving range of the electric vehicle. In addition, current power architectures for electric vehicles are inflexible in that the power is stored in a central battery, and each device using electricity in the vehicle must receive power from the central battery.

The systems, vehicles, and methods disclosed herein describe a wireless architecture for wirelessly transmitting power from multiple auxiliary power devices to one or more batteries or vehicle components in a flexible manner. By wirelessly transmitting the generated electrical power instead of using wires, the weight of the wires and cables may be removed from the electric vehicle, thereby reducing weight and improving fuel economy. In addition, wireless electrical energy transfer results in enhanced reliability, as wires and cables may fail over time. The additional auxiliary power devices may increase fuel economy and may increase driving range by providing multiple alternative sources of electrical energy.

Auxiliary power devices configured to generate electrical energy for storage in one or more vehicle batteries includes thermal heat sources, vibrational energy sources, deformational energy sources, and solar energy sources. The auxiliary power devices used to generate electrical energy may be physically located at different parts of the electric vehicle, allowing for increased flexibility in the context of a modular vehicle, where various parts of the electric vehicle may be interchangeably added or removed.

Figure 1:
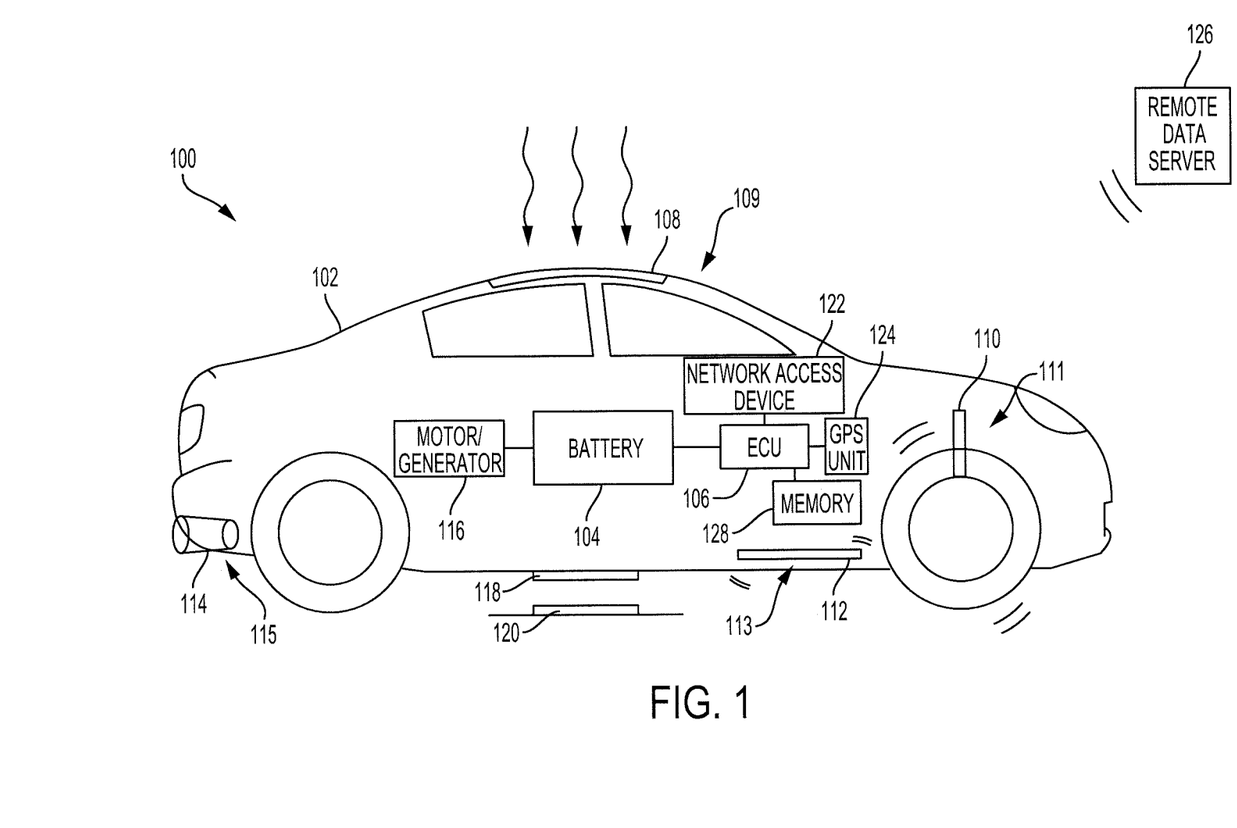
FIG. 1 illustrates an example auxiliary wireless power transfer system, according to an aspect of the invention.

FIG. 1 illustrates an example auxiliary wireless power transfer system, according to an aspect of the invention. The system 100 includes a vehicle 102. The vehicle 102 may be a fully electric or partially electric vehicle. The vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle, a fuel cell vehicle, or any other type of vehicle that includes the motor/generator 116. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 may have one or more batteries 104 configured to store electrical energy. The batteries 104 may include one or more main batteries configured to power the electrical components of the vehicle 102, or may include one or more main batteries and one or more auxiliary batteries configured to power various respective parts of the vehicle 102, as described herein.

The vehicle 102 may include one or more computers or electronic control units (ECUs) 106, appropriately programmed, to control one or more operations of the vehicle 102. The one or more ECUs 106 may be implemented as a single ECU or in multiple ECUs. The ECU 106 may be electrically coupled to some or all of the components of the vehicle 102. In some embodiments, the ECU 106 is a central ECU configured to control one or more operations of the entire vehicle 102. In some embodiments, the ECU 106 is multiple ECUs located across the vehicle 102 and each configured to control one or more local operations of the vehicle 102. For example, the vehicle 102 may include an auxiliary ECU for each of the auxiliary power devices (e.g., solar device 108, vibrational device 110, deformational device 112, and thermal device 114) and each of the auxiliary ECUs may control one or more operations of the auxiliary power devices and storage, transmission, and use of the electrical energy generated by the respective auxiliary power device.

The motor/generator 116 may be an electric motor and/or an electric generator that converts electrical energy into mechanical power, such as torque, and/or converts mechanical power into electrical energy. The motor/generator 116 may be coupled to the battery 104. The motor/generator 116 may convert the energy from the battery 104 into mechanical power, and may provide energy back to the battery 104.

The vehicle 102 may include multiple auxiliary power devices configured to generate electrical energy. The auxiliary power devices may include a solar device 108 configured to generate electrical energy by converting solar energy into electrical energy. Accordingly, the solar device 108 may be located physically on the roof 109 of the vehicle 102 and oriented to receive solar energy from a light source, such as the Sun. In some embodiments, the solar device 108 may change orientation by tilting or bending, and the orientation of the solar device 108 may be adjusted based on the time of day, time of year, and/or location of the vehicle on the Earth to maximize exposure to the Sun.

The auxiliary power devices may also include a vibrational device 110 configured to generate electrical energy by converting vibrational energy into electrical energy. The vibrational device 110 may include a triboelectric generator for generating the electrical energy. The vibrational device 110 may be located on or adjacent to parts of the vehicle 102, which fluctuate position dramatically, such as the suspension 111. In particular, the vibrational device 110 may be located on or adjacent to the shock absorber or the strut.

In some embodiments, the triboelectric generator generates electrical energy by converting frictional energy into electrical energy. In these embodiments, the triboelectric generator may include two surfaces located on a piston and a cylinder of the shock absorber, and the rubbing of the two surfaces as the vehicle traverses over uneven terrain generates frictional energy which is converted into electrical energy by the triboelectric generator.

The auxiliary power devices may also include a deformational device 112 configured to generate electrical energy by converting deformational energy into electrical energy. The deformational device 112 may include a piezoelectric generator for generating the electrical energy. The deformational device 112 may be located on or adjacent to the chassis 113 of the vehicle 102, which experiences elastic vibrations of low amplitude and high frequency, as compared to the vibrations experienced by the vibrational device 110, which are higher in amplitude and lower in frequency. The elastic vibrations may cause deformation from mechanical stress. In some embodiments, the deformational device 112 is located between a seat and the chassis of the vehicle 102.

In some embodiments, the piezoelectric generator generates electrical energy by converting mechanical stress into electrical energy. In these embodiments, the piezoelectric generator may be located on a surface of the vehicle 102 which is subject to elastic vibrations, such as the chassis. When the vehicle 102 traverses over uneven terrain, the piezoelectric generator converts the elastic vibrations experienced by the chassis into electrical energy.

The vibrational device 110 and the deformational device 112 may additionally benefit from the wireless electrical energy transmission to a battery because of the movement associated with parts of the vehicle proximal to the locations of the vibrational device 110 and the deformational device 112. For example, a vibrational device 110 may be located on or near a shock absorber or a strut. If the vibrational device 110 were to transmit generated electrical energy using wires, the wires may wear out over time, as they may be subject to stresses from the oscillation and movement of the shock absorber or the strut. In another example, if the deformational device 112 were to transmit generated electrical energy using wires, the wires may also be subject to increased wear and team from the elastic vibrations, and in addition, may also cause an unpleasant rattling or vibrating noise.

The auxiliary power devices may also include a thermal device 114 configured to generate electrical energy by converting thermal energy into electrical energy. The thermal device 114 may include a thermal-electric generator for generating the electrical energy. The thermal device 114 may be located on or adjacent to parts of the vehicle 102 which undergo fluctuations in temperature, such as the exhaust system 115.

In some embodiments, the thermoelectric generator generates electrical energy by converting thermal energy into electrical energy. In these embodiments, the thermoelectric generator may be located on an exhaust pipe which guides exhaust gases away from an engine. The exhaust pipe heats up and the thermoelectric generator converts the thermal energy into electrical energy.

The vehicle 102 may also be charged wirelessly via a wireless charging station 120, which receives electrical energy from an AC grid, and wirelessly transmits the electrical energy to a wireless receiver 118 attached to the vehicle 102 and connected to the battery 104. The wireless charging station 120 may be located in a garage of a building, such as an office building or a home.

The vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 126. The remote data server 126 may be one or more servers from different service providers. Each of the one or more servers may be connected to one or more databases. A service provider may provide navigational map, weather and/or traffic data to the vehicle 102.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitudinal coordinates.

The network access device 122 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 122 may transmit data to and receive data from devices and systems not directly connected to the vehicle 102. For example, the ECU 106 may communicate with the remote data server 126. Furthermore, the network access device 122 may access the network, to which the remote data server 126 is also connected.

The GPS unit 124 is connected to the ECU 106 and configured to determine location data. The ECU 106 may use the location data along with map data to determine a location of the vehicle 102. In other embodiments, the GPS unit 124 has access to map data and may determine the location of the vehicle and provide the location of the vehicle to the ECU 106.

The memory 128 is connected to the ECU 106 and may be connected to any other component of the vehicle 102. The memory 128 is configured to store any data described herein, such as map data, location data, and any data received from the remote data server 126 via the network access device 122.

The operation of the auxiliary power devices may be adjusted based on a location of the vehicle 102 as determined by the ECU 106, the network access device 122, and/or the GPS unit 124. For example, the orientation of the solar device 108 may be adjusted based on the location of the vehicle 102 to maximize exposure to the Sun. In another example, the vibrational device 110 and/or the deformational device 112 may be deactivated when the vehicle 102 is located in an area with smooth driving surfaces where the energy generated by the vibrational device 110 and/or the deformational device 112 may not be greater than the energy spent powering the devices. In yet another example, the thermal device 114 may be deactivated when the vehicle 102 is located in an extremely cold location where the thermal device 114 may not heat up enough to justify powering the thermal device 114.

Figure 2A:
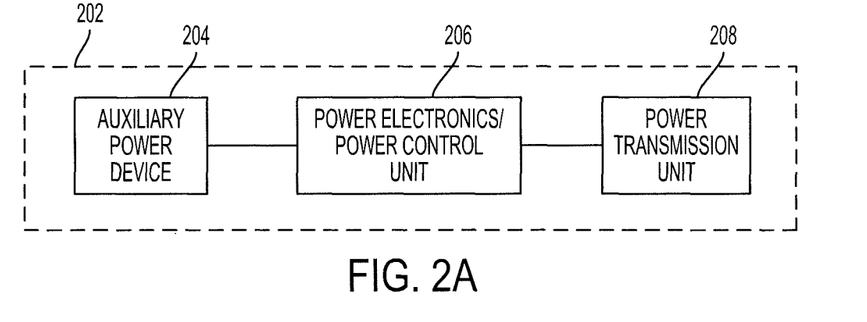
FIG. 2A illustrates an auxiliary module, according to various embodiments of the invention.

FIG. 2A illustrates an auxiliary module 202, according to various embodiments of the invention. Each auxiliary module 202 includes an auxiliary power device 204, a power electronics/power control unit 206, and a power transmission unit 208 (or transmitter). In some embodiments, the auxiliary module 202 may be a physical structure containing the auxiliary power device 204, the power electronics/power control unit 206, and the power transmission unit 208. In some embodiments, the auxiliary module 202 is used simply to refer to the collection of the elements within the auxiliary module 202. The auxiliary module 202 may not always contain the power electronics/power control unit 206 if the electrical energy does not require any processing to be stored or wirelessly transmitted. The auxiliary module 202 may be referred to as an auxiliary unit or an auxiliary element.

The auxiliary power device 204 may be any type of device configured to generate electrical energy. For example, the auxiliary power device 204 may be a solar device 108, a vibrational device 110, a deformational device 112, or a thermal device 114, as described herein.

The power electronics/power control unit 206 may be configured to convert the electrical power generated by the auxiliary power device 204 to the appropriate electrical power for use by a component of the vehicle 102 or for storage in a battery (e.g., the battery 104). For example, the power electronics/power control unit 206 may be configured to step up or step down the voltage of the generated electrical energy and/or convert the generated electrical energy into AC for wireless transmission via the power transmission unit 208, and/or adjust a frequency of the AC signal. The power electronics/power control unit 206 may also include an ECU configured to control one or more aspects of the auxiliary power device 204, such as activation of the auxiliary power device 204 or settings associated with the auxiliary power device 204.

The power transmission unit 208 is configured to wirelessly transmit the generated electrical energy. The power transmission unit 208 may include an antenna or various configurations of charging coils configured to transmit power wirelessly. In some embodiments, the antenna or the at least one wire may be constructed as a coil or loop that is configured to transmit power wirelessly. The antenna or the at least one wire may be configured such that power is transmitted through inductive coupling. The antenna or the at least one wire may be configured to produce a varying magnetic field that is capable of inducing current in a nearby antenna or at least one wire. In some embodiments, the antenna or the at least one wire is configured to form a magnetic resonant coupling with a receiving unit (e.g., power receiving unit 216 and power receiving unit 226) to deliver power. In other embodiments, capacitive coupling or magnetodynamic coupling may be used.

Figure 2B:
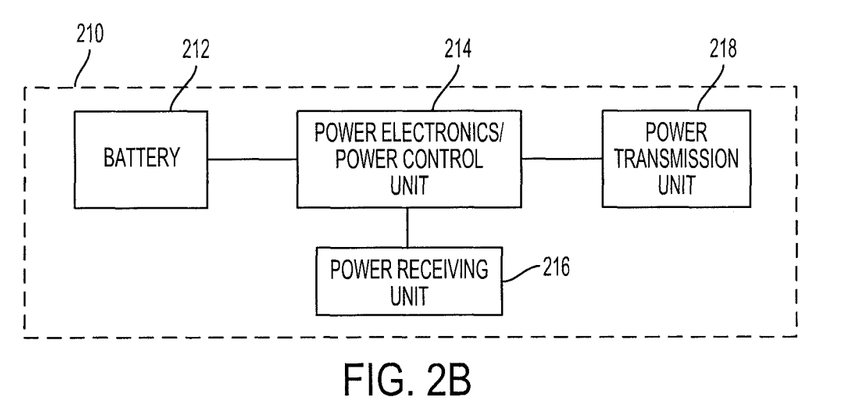
FIG. 2B illustrates a battery module according to various embodiments of the invention.

FIG. 2B illustrates a battery module 210 according to various embodiments of the invention. The battery module 210 includes a battery 212, a power electronics/power control unit 214, a power receiving unit 216 (or receiver) and a power transmission unit 218 (or transmitter). In some embodiments, the battery module 210 may be a physical structure containing the battery 212, the power electronics/power control unit 214, the power receiving unit 216 and the power transmission unit 218. In some embodiments, the battery module 210 is used simply to refer to the collection of the elements within the battery module 210. The battery module 210 may not always contain the power electronics/power control unit 214 if the electrical energy does not require any processing to be stored or wirelessly transmitted or wirelessly received. The battery module 210 may be referred to as a battery unit or a battery element.

The power receiving unit 216 is configured to receive power wirelessly, either directly from an auxiliary module 202 or a power bus, as described herein. The power receiving unit 216 may include an antenna or at least one wire configured to receive power wirelessly. In some embodiments, the antenna or the at least one wire may be constructed as a coil or a loop that is configured to receive power wirelessly. The antenna or the at least one wire may be configured such that power is transmitted through inductive coupling. The antenna or the at least one wire may have current induced in it through a magnetic field applied by a corresponding antenna or at least one wire. In some embodiments, the antenna or the at least one wire is configured to form a magnetic resonant coupling with a power transmission unit (e.g., the power transmission unit 208) to deliver power.

The power transmission unit 218 is configured to wirelessly transmit the electrical energy stored in the battery 212. The power transmission unit 218 may be similar to the power transmission unit 208, with the power transmission unit 218 providing electrical energy from the battery 212 and the power transmission unit 208 providing electrical energy from the auxiliary power device 204. The power transmission unit 218 may be used to transmit stored electrical energy from the battery 212 to another device, such as another battery module or a vehicle load device module, as shown in FIG. 2C.

The power electronics/power control unit 214 connected to the power receiving unit 216 may be configured to convert the received electrical power to the appropriate electrical power for storage in the battery 212. For example, the electrical energy received by the power receiving unit 216 may be in AC, and the power electronics/power control unit 214 may convert the AC to DC and/or may step up or step down the voltage, for storing the electrical energy in the battery 212.

The power electronics/power control unit 214 connected to the power transmission unit 218 may be configured to convert the electrical power stored in the battery 212 to the appropriate electrical power for transmitting to another device. For example, the power electronics/power control unit 214 may be configured to step up or step down the voltage of the stored electrical energy and/or convert the stored electrical energy into AC for wireless transmission via the power transmission unit 218, and/or adjust a frequency of the AC signal. The power electronics/power control unit 214 may also include an ECU configured to control one or more aspects of the battery 212.

Figure 2C:
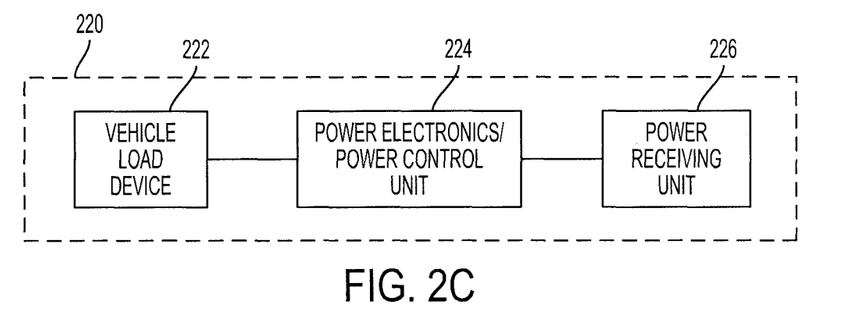
FIG. 2C illustrates a vehicle load device module, according to various embodiments of the invention.

FIG. 2C illustrates a vehicle load device module 220, according to various embodiments of the invention. The vehicle load device module 220 includes a vehicle load device 222, a power electronics/power control unit 224, and a power receiving unit 226 (or receiver). In some embodiments, the vehicle load device module 220 may be a physical structure containing the vehicle load device 222, the power electronics/power control unit 224, and the power receiving unit 226. In some embodiments, the vehicle load device module 220 is used simply to refer to the collection of the elements within the vehicle load device module 220. The vehicle load device module 220 may not always contain the power electronics/power control unit 224 if the electrical energy does not require any processing to be used or wirelessly received. The vehicle load device module 220 may be referred to as a vehicle load device unit or a vehicle load device element.

The vehicle load device 222 may be any device which uses electrical energy and located on the vehicle 102 or inside the vehicle 102. For example, the vehicle load device 222 may be a mobile device charging unit, a light, or an infotainment unit of the vehicle. In some embodiments, the vehicle load device may be the motor/generator configured to propel the vehicle 102.

The power receiving unit 226 is configured to receive power wirelessly, either directly from an auxiliary module 202, a battery module 210, or a power bus, as described herein. The power receiving unit 226 may include an antenna or at least one wire configured to receive power wirelessly. In some embodiments, the antenna or the at least one wire may be constructed as a coil or loop that is configured to receive power wirelessly. The antenna or the at least one wire may be configured such that power is transmitted through inductive coupling. The antenna or the at least one wire may have current induced in it through a magnetic field applied by a corresponding antenna or at least one wire. In some embodiments, the antenna or the at least one wire is configured to form a magnetic resonant coupling with a power transmission unit (e.g., power transmission unit 208 or power transmission unit 218) to deliver power.

The power electronics/power control unit 224 connected to the power receiving unit 226 may be configured to convert the received electrical power to the appropriate electrical power for use by the vehicle load device 222. For example, the electrical energy received by the power receiving unit 226 may be in AC, and the power electronics/power control unit 224 may convert the AC to DC and/or may step up or step down the voltage, for using the electrical energy by the vehicle load device 222.

Various figures herein may depict interactions between an auxiliary module 202, a battery module 210, and/or a vehicle load device module 220. When reference is made herein to electrical energy being transferred between modules (e.g., an auxiliary module 202, a battery module 210, or a vehicle load device module 220), it is understood that the electrical energy is being transferred between the respective power receiving units or power transmission units of the modules.

Figure 3A:
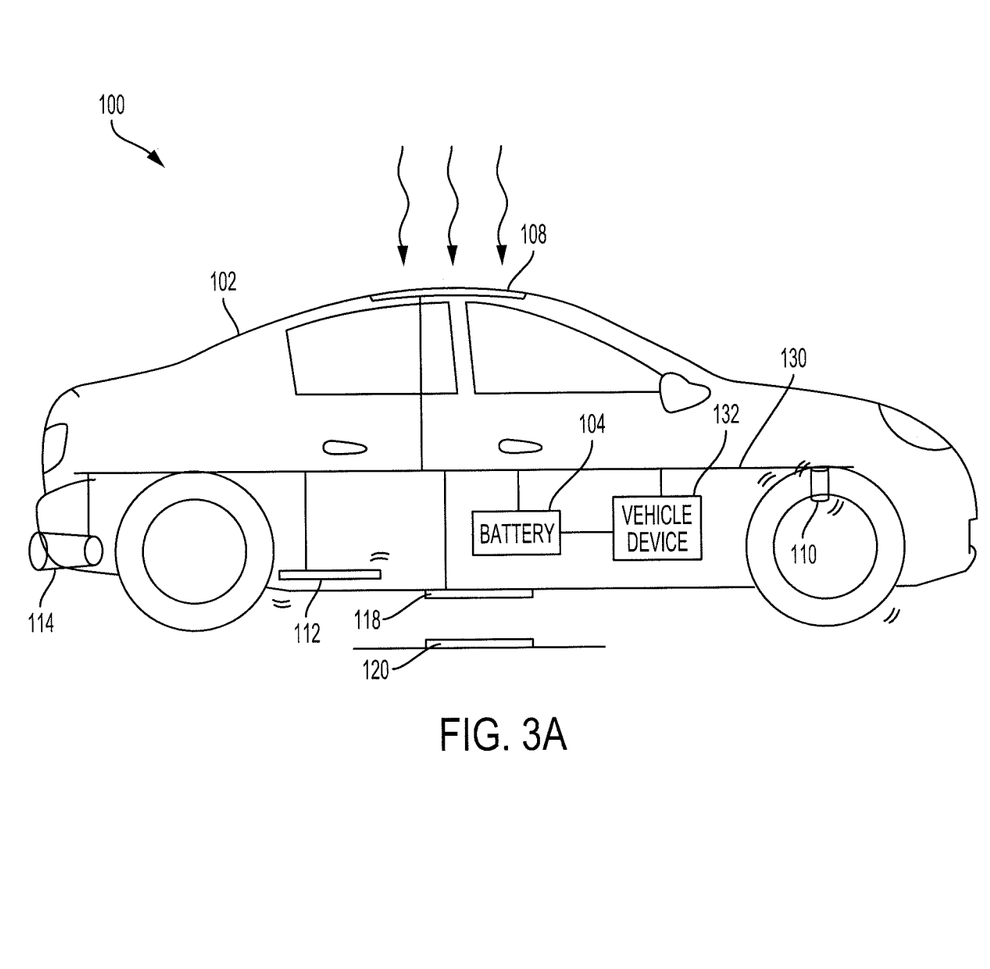
FIG. 3A is an illustration of how the various power components of the auxiliary wireless power transfer system are connected, according to an aspect of the invention.

FIG. 3A is an illustration of how the various power components of the auxiliary wireless power transfer system 100 may be connected, according to various embodiments of the invention. The various electrical energy generating components, electrical energy storing components, and electrical energy consuming components of vehicle 102 are connected via a power bus 130. The power bus 130 is configured to route power (e.g., electrical energy) from one location to another. The power bus 130 may be managed by one or more ECUs, as described herein. The power bus 130 may be made from one or more conductive elements, such as a conductive bar or a conductive wire or cable.

Electrical energy generating (or producing/providing/converting) devices are connected to the power bus 130. As shown in FIG. 3A, the solar device 108, the vibrational device 110, the deformational device 112, the thermal device 114, and the wireless receiver 118 are connected to the power bus 130. The electrical energy generating devices may be connected to the power bus 130 via wires or may be connected wirelessly, as further illustrated in FIG. 3B.

Electrical energy storing devices, such as battery 104, are connected to the power bus 130 and configured to receive electrical energy from the electrical energy generating devices. The electrical energy storing devices may be connected to the power bus 130 via wires or may be connected wirelessly, as further illustrated in FIG. 3B. The electrical energy storing devices may also provide electrical energy to the power bus 130 to power various electrical energy consuming devices, such as a vehicle device 132.

Electrical energy consuming devices, such as a vehicle device 132 (e.g., a motor/generator 116, an infotainment unit of the vehicle 102, a light of the vehicle 102, or an air conditioning/heating unit of the vehicle 102) are also connected to the power bus 130 and configured to receive electrical energy from the electrical energy generating devices or the electrical energy storing devices. The electrical energy consuming devices may be connected to the power bus 130 via wires or may be connected wirelessly, as further illustrated in FIG. 3B.

The ECU 106 may coordinate transmission of electrical energy based on various factors. The transmission may be based on environmental or time factors, such as time of day, day of the week, time of year, or geographic location. For example, electrical energy generated by the vibrational device 110 may be stored in the battery 104 when the vehicle 102 is located in a rough terrain where the vibrations are of higher amplitude and lower frequency, resulting in an inconsistent flow of electrical energy. The electrical energy generated by the vibrational device 110 may be used by the vehicle device 132 (e.g., a mobile device charging unit) when the vehicle 102 is located in a paved terrain where the vibrations are more consistent, having a lower amplitude and higher frequency, resulting in a more consistent flow of electrical energy.

In another example, the solar device 108 configured to generate electrical energy from light may transmit electrical energy to the battery 104 when the vehicle 102 is powered on, as the battery 104 may provide power to the motor/generator 116 used to propel the vehicle 102, and the solar device 108 may transmit electrical energy to the vehicle device 132 (e.g., an air conditioning or heating unit) when the vehicle 102 is parked, in order to maintain a particular temperature inside the passenger cabin. The state of the vehicle 102 and the state of any elements within the vehicle 102 may be determined by one or more ECUs.

Figure 4A:
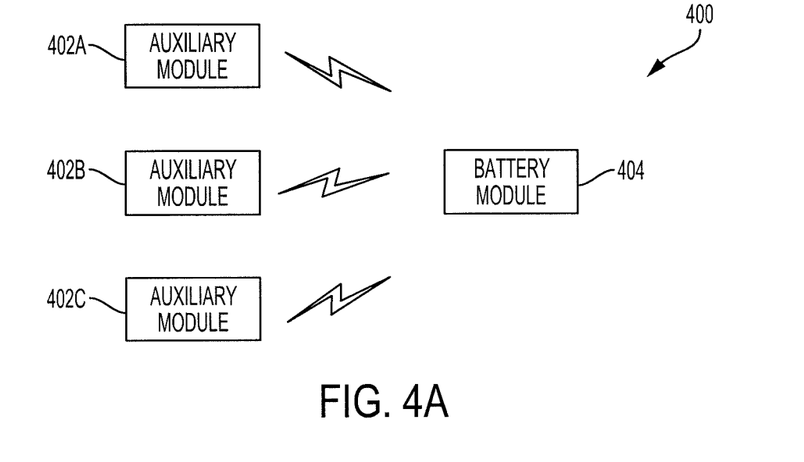
FIG. 4A illustrates a power architecture of a vehicle using the auxiliary wireless power transfer system with a main battery, according to an embodiment of the invention.
Figure 4B:
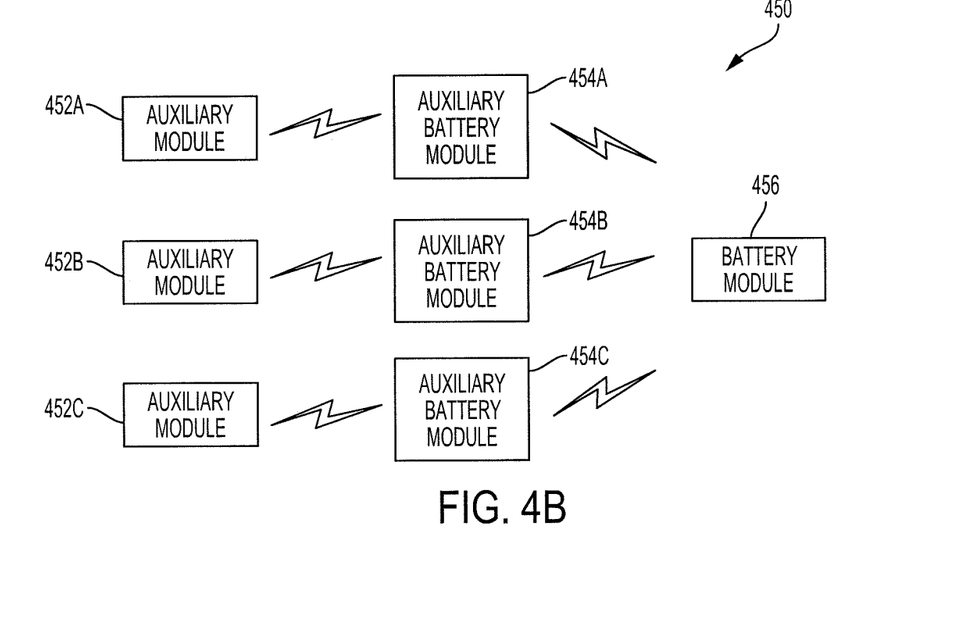
FIG. 4B illustrates a power architecture of a vehicle using the auxiliary wireless power transfer system with auxiliary batteries and a main battery, according to an embodiment of the invention.

In some embodiments, when the vehicle 102 has a main battery and multiple auxiliary batteries charged by a respective auxiliary power device, as shown in FIG. 4B, the location of the vehicle 102 may be used to determine how electrical energy is distributed between the main battery and the auxiliary battery. For example, when the vehicle 102 is in an area with rough or uneven terrain, an increased electrical energy generation by the vibrational device 110 and the deformational device 112 may be anticipated. Accordingly, the electrical energy generated by the vibrational device 110 and the deformational device 112 when the vehicle 102 is in an area of rough or uneven terrain may be stored in the main battery instead of the respective auxiliary batteries. In another example, a steep uphill ascent may be anticipated based on the map data, and the electrical energy generated by the auxiliary power devices may be stored in the main battery in anticipation of the uphill ascent to provide extra power to the motor/generator 116.

In some embodiments, when the vehicle 102 has multiple batteries, the states of charge for all batteries are maintained evenly. In these embodiments, electrical energy is routed between the various batteries via the power bus 130 to maintain an even state of charge. In some embodiments, a particular ratio of charge is maintained between a main battery and each auxiliary battery. For example, the main battery may be maintained at a state of charge of 80%, and any excess electrical energy may be stored in the auxiliary batteries. In another example, the auxiliary batteries may be maintained at a state of charge of 80%, and any excess electrical energy may be stored in the main battery.

An ECU connected to some or all of the components in the system may coordinate the transfer of electrical energy from one device to another. A GPS unit 124 connected to the ECU may be used to detect location data associated with the vehicle 102, and a network access device 122 also connected to the ECU may be used to receive data indicating a time of day, a day of the week, a location, or other data.

Figure 3B:
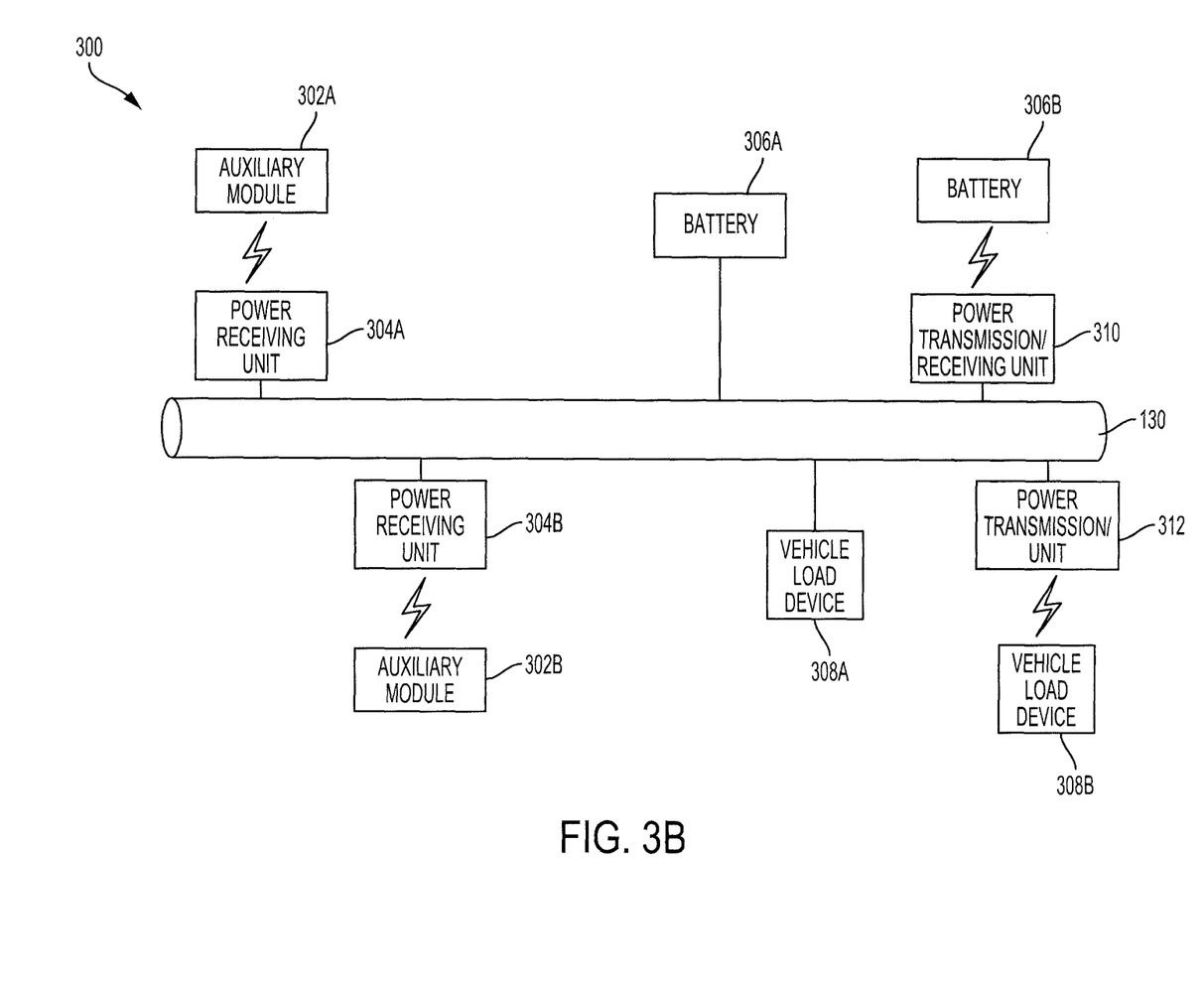
FIG. 3B illustrates a power architecture of a vehicle using the auxiliary wireless power transfer system, according to an embodiment of the invention.

FIG. 3B illustrates a power architecture of the vehicle 102 using a power bus 130, according to an embodiment of the invention.

The auxiliary modules 302 (e.g., auxiliary module 202) are connected to the power bus 130 wirelessly to transmit electrical energy. Each auxiliary module 302 transmits electrical energy using a power transmission unit (e.g., power transmission unit 208) to a power receiving unit 304 connected to the power bus 130.

The power bus 130 is configured to provide the electrical energy to a battery module 306 (e.g., battery module 210) or a vehicle load device module 308 (e.g., vehicle load device module 220). The battery module 306 or the vehicle load device module 308 may be connected to the power bus 130 using a wired connection, as shown by the battery module 306A and the vehicle load device module 308A. The battery module 306 or the vehicle load device module 308 may be connected to the power bus 130 using a wireless connection, as shown by the battery module 306B and the vehicle load device module 308B.

When the battery module 306B is connected to the power bus 130 via a wireless connection, a power transmission/receiving unit 310 may be connected to the power bus 130. The power transmission/receiving unit 310 is configured to transmit electrical energy to the battery module 306B when the battery of the battery module 306 is being charged. The power transmission/receiving unit 310 is also configured to receive electrical energy from the battery module 306B when the battery of the battery module 306B is used to power a device, such as the vehicle load device of the vehicle load device module 308.

When the vehicle load device module 308B is connected to the power bus 130 via a wireless connection, a power transmission unit 312 may be connected to the power bus 130. The power transmission unit 312 is configured to transmit electrical energy to the vehicle load device module 308B when the vehicle load device of the vehicle load device module 308B is being used and drawing power.

Any combination of wired and wireless connections may be used in the system 300. One or more ECUs may be used to coordinate the routing and transmission of the electrical energy travelling across the power bus 130. The one or more ECUs may be connected to the control units of the auxiliary modules 302, the battery modules 306, and the vehicle load device modules 308 to coordinate the routing and transmission of the electrical energy.

FIG. 4A illustrates a system 400 showing a power architecture of the vehicle 102, according to an embodiment of the invention. The power architecture shown in FIG. 4A may be considered a multiport AC transmission architecture.

In the system 400 illustrated in FIG. 4A, each auxiliary module 402 (e.g., auxiliary module 202) includes an auxiliary power device, a power electronics/power control unit, and a power transmission unit, as shown in FIG. 2A. The battery module 404 has a power receiving unit connected to a power electronics/power control unit, which is connected to a battery, as shown in FIG. 2B.

Each auxiliary module 402 transmits the generated electrical energy wirelessly and directly to the battery module 404. A power transmission unit (e.g., power transmission unit 208) of the auxiliary module 402 transmits the electrical energy to a power receiving unit (e.g., power receiving unit 216) of the battery module 404. In some embodiments, the battery module 404 may be replaced with a vehicle load device module (e.g., vehicle load device module 220), and the auxiliary modules 402 may provide power to the vehicle load device module.

One or more ECUs may be used to coordinate the timing and transmission of the electrical energy from the auxiliary modules 402 to the battery module 404. The one or more ECUs may be connected to the control units of the auxiliary modules 402, the battery module 404, and the vehicle load device modules to coordinate the timing and transmission of the electrical energy.

FIG. 4B illustrates a system 450 showing a power architecture of the vehicle 102, according to an embodiment of the invention. The power architecture shown in FIG. 4B may be considered a multiport AC transmission architecture.

In the system 450 illustrated in FIG. 4B, each auxiliary module 452 (e.g., auxiliary module 202) includes an auxiliary power device, a power electronics/power control unit, and a power transmission unit, as shown in FIG. 2A.

The auxiliary modules 452 each have a respective auxiliary battery module 454 that the auxiliary module 452 transmits electrical power to. Similar to the battery module 210 shown in FIG. 2B, each auxiliary battery module 454 has a power receiving unit connected to a power electronics/power control unit, which is connected to an auxiliary battery. That is, first auxiliary module 452A generates and transmits electrical energy to the first auxiliary battery unit 454A for storage in a first auxiliary battery. The second auxiliary module 452B generates and transmits electrical energy to the second auxiliary battery module 454B for storage in a second auxiliary battery. The third auxiliary module 452C generates and transmits electrical energy to the third auxiliary battery module 454C for storage in a third auxiliary battery.

The auxiliary battery modules 454 may be located on the vehicle 102 proximal to the locations of the respective auxiliary modules 452. For example, when the auxiliary power device of an auxiliary module 452 is a vibrational device located near the front suspension of the vehicle 102, the auxiliary battery module 454 may also be located near the front suspension of the vehicle 102.

The auxiliary battery module 454 may wirelessly transmit electrical power to a main battery module 456 (via a power transmission unit of the auxiliary battery module 454 and a power receiving unit of the main battery module 456) or the auxiliary battery module 454 may be used to power electrical devices in proximity to the auxiliary module 452 and the auxiliary battery module 454. For example, when the auxiliary module 452 is located proximal to the front part of the vehicle chassis, the auxiliary battery module 454 may provide power to a mobile device charger located inside the passenger cabin. In this way, the auxiliary battery module 454 may provide power to the vehicle 102 without routing the electrical energy to the main battery module 456. In some embodiments, using the auxiliary battery module 454 to power a device proximal to the respective auxiliary module 452 may be more energy efficient than aggregating all of the electrical energy to the main battery module 456 and then powering the device using the main battery module 456.

Figure 5:
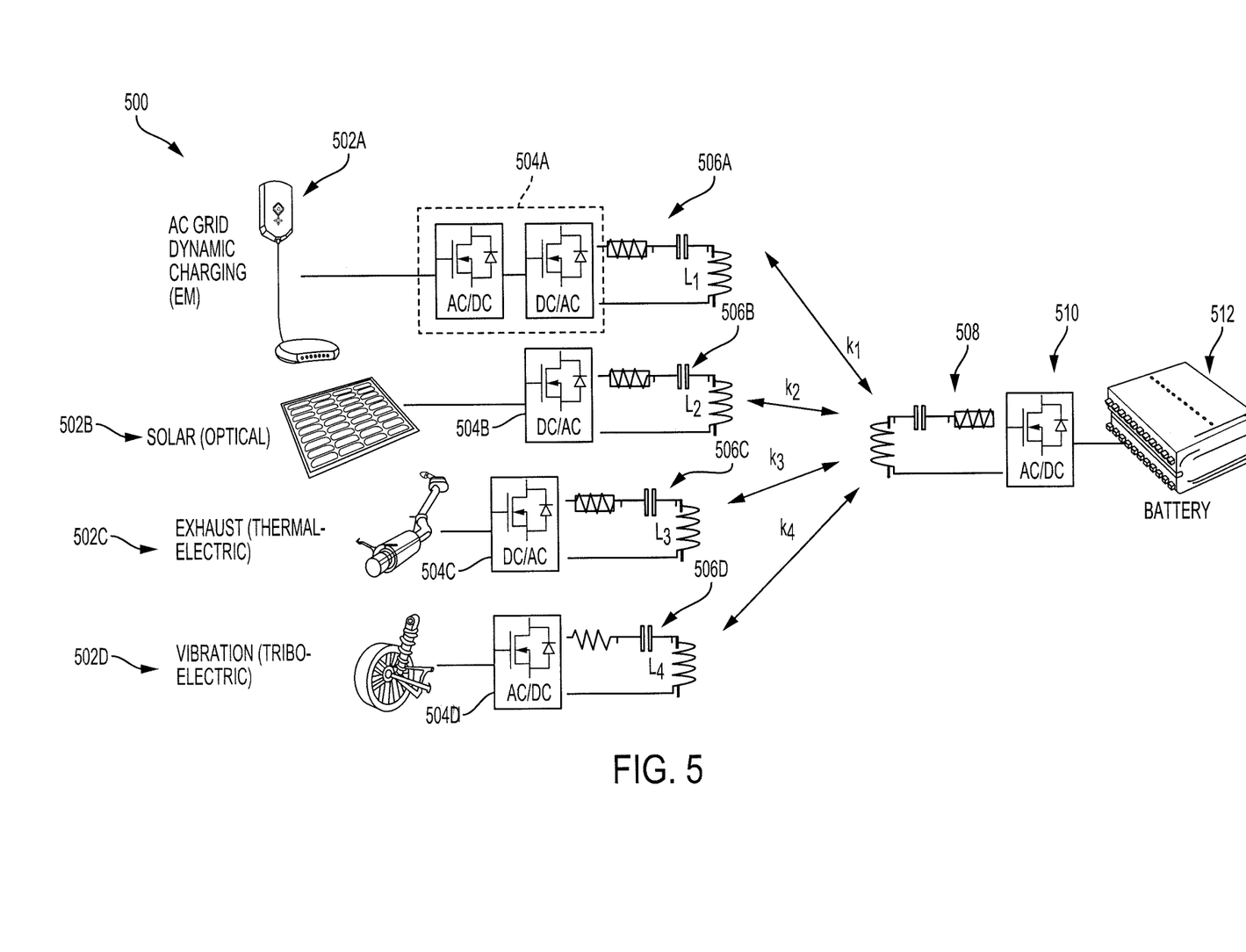
FIG. 5 illustrates the auxiliary wireless power transfer system, according to an embodiment of the invention.

FIG. 5 illustrates an embodiment of the auxiliary wireless power transfer system 500, according to an embodiment of the invention. The system 500 is similar to the system 400 of FIG. 4A and like elements are numbered similarly.

The system 500 includes a charging device 502A. The charging device 502A may be a charging station similar to charging station 120 described herein. The charging device 502A provides electrical energy from an AC grid. The charging device 502A is connected to a power electronics unit 504A which is configured to control and regulate the electrical power using an AC/DC converter along with a DC/AC converter. The controlled and regulated electrical power is transmitted using a coil 506A. The electrical power is transmitted to a receiving coil 508 connected to a power electronics unit 510 configured to convert the received electrical energy for storage in the battery 512.

Similarly, the system 500 includes a solar device 502B. The solar device 502B may be similar to solar device 108. The solar device 502B converts photons received from various light sources to electrical energy. The solar device 502B is connected to a power electronics unit 504B, which converts the DC electrical energy output by the solar device 502B into AC electrical energy suitable for wireless transmission via transmission coil 506B. The transmission coil 506B transmits the electrical energy wirelessly to the receiving coil 508, which stores the electrical energy in the battery 512, as described herein.

The system 500 also includes a thermal device 502C attached to the exhaust of the vehicle 102. The thermal device 502C may be similar to thermal device 114 and converts heat waste generated by the exhaust into electrical energy. The thermal device 502C is connected to a power electronics unit 504C, which converts the DC electrical energy output by the thermal device 502C into AC electrical energy suitable for wireless transmission via transmission coil 506C. The transmission coil 506C transmits the electrical energy wirelessly to the receiving coil 508, which stores the electrical energy in the battery 512, as described herein.

The system 500 also includes a vibrational device 502D, which is configured to convert vibrational energy into electrical energy. The vibrational device 502D is connected to a power electronics unit 504D, which controls and regulates the AC electrical energy output by the vibrational device 502D into AC electrical energy suitable for wireless transmission via transmission coil 506D. In some embodiments, the power electronics unit 504D smooths the signal of the AC electrical energy generated by the vibrational device 502D. The transmission coil 506D transmits the electrical energy wirelessly to the receiving coil 508, which stores the electrical energy in the battery 512, as described herein.

Figure 6:
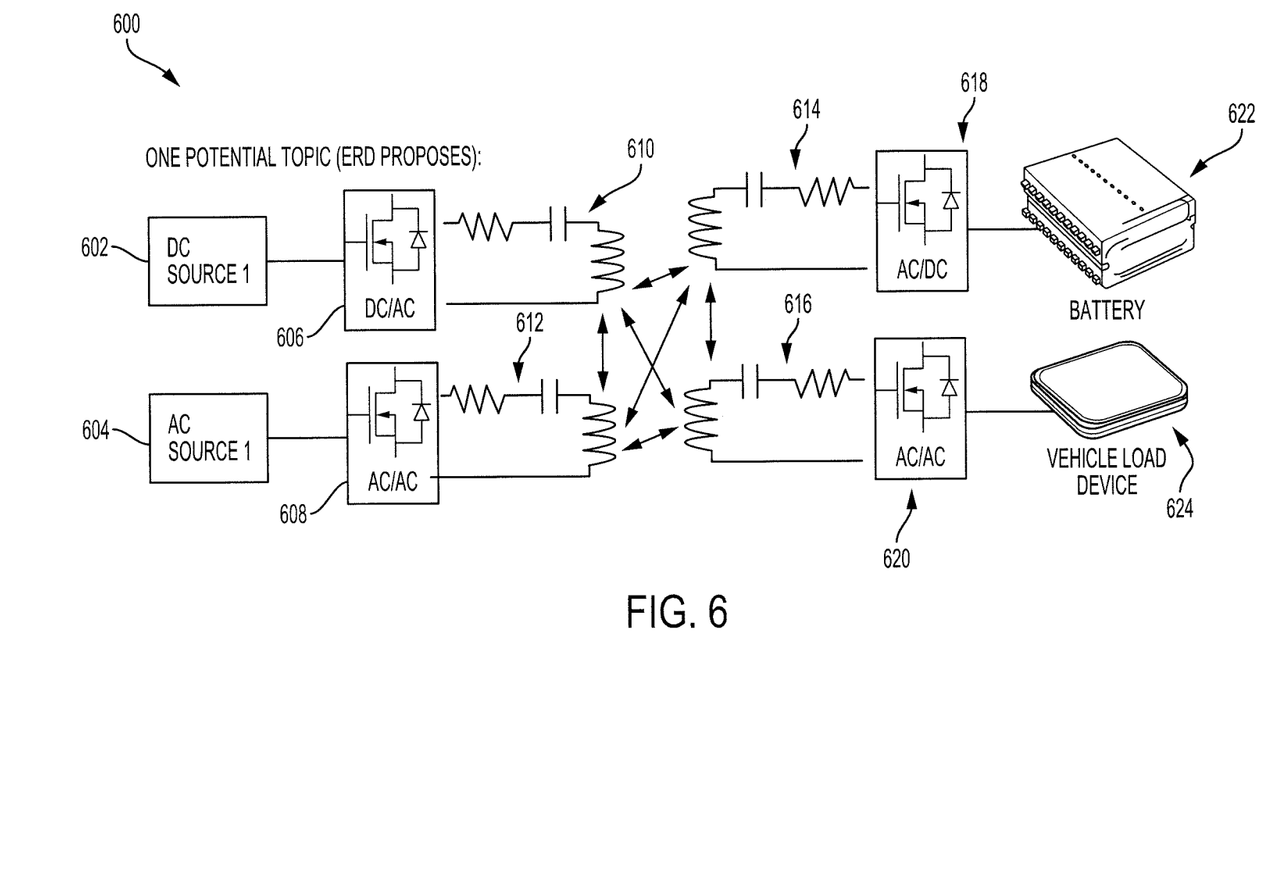
FIG. 6 illustrates the auxiliary wireless power transfer system, according to an embodiment of the invention.

FIG. 6 illustrates the auxiliary wireless power transfer system 600, according to an embodiment of the invention. The system 600 includes a DC power source 602 connected to a power electronics unit 606, which is connected to a coil 610. The DC power source 602 may be a device configured to generate DC electrical power, such as the solar device 108 described herein. The power electronics unit 606 is configured to convert the DC electrical power into AC electrical power. The power electronics unit 606 may also regulate the voltage of the electrical power and prepare the electrical power for wireless transmission. The coil 610 may be configured to inductively transmit the AC electrical power.

The system 600 includes an AC power source 604 connected to a power electronics unit 608, which is connected to a coil 612. The AC power source 604 may be a device configured to generate AC electrical power, such as the vibrational device 110 or the deformational device 112 described herein. The power electronics unit 608 is configured to process the AC electrical power for wireless transmission. The power electronics unit 608 may also regulate the voltage of the electrical power. The coil 612 may be configured to inductively transmit the AC electrical power.

The system 600 also includes a battery 622 configured to store received electrical energy. The battery 622 is connected to a power electronics unit 618, which is configured to convert AC electrical power received by the coil 614 into DC electrical power for storage in the battery 622. The coil 614 is configured to inductively receive AC electrical power.

The system 600 also includes a vehicle load device 624 configured to use electrical energy. The vehicle load device 624 may be any device which uses electrical energy and located on the vehicle 102 or inside the vehicle 102. For example, the vehicle load device 624 may be a mobile device charging unit, a light, or an infotainment unit of the vehicle. The vehicle load device 624 is connected to a power electronics unit 620, which is configured to process the AC electrical power received by the coil 616 into AC electrical power suitable for use by the vehicle load device 624. In some embodiments, the power electronics unit 620 steps up or steps down the voltage received by the coil 616. The coil 616 is configured to inductively receive AC electrical power.

The DC power source 602, the AC power source, the battery 622, and the vehicle load device 624 are each connected to each other wirelessly, as shown in FIG. 6. As a result, a flexible and dynamic exchange of electrical energy may be achieved. For example, the DC power source 602 may transfer electrical energy for storage in battery 622, or may transfer electrical energy to vehicle load device 624 to power a device within the vehicle 102.

Figure 7:
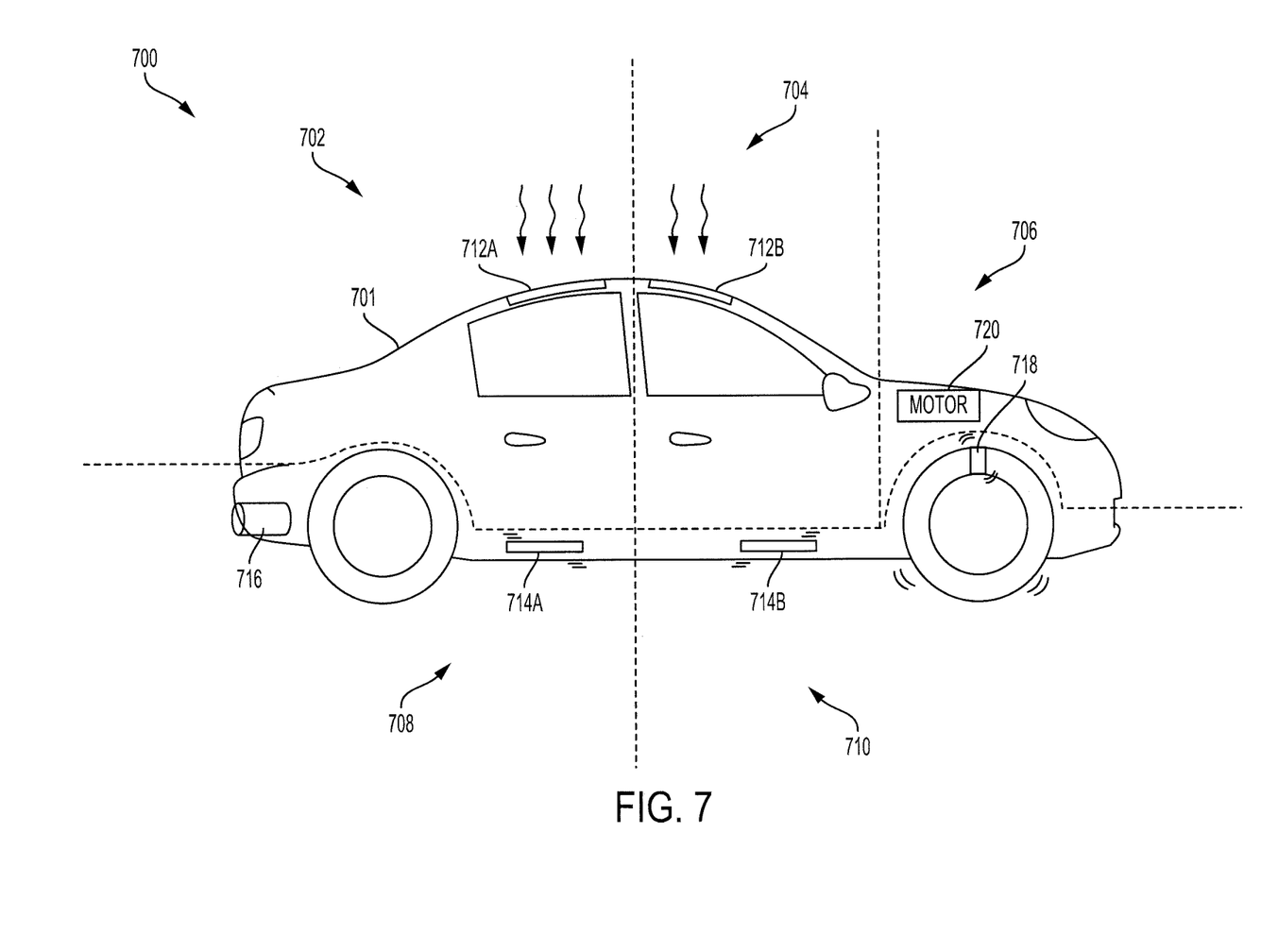
FIG. 7 illustrates the auxiliary wireless power transfer system of a modular vehicle, according to an embodiment of the invention.

FIG. 7 illustrates an embodiment of the auxiliary wireless power transfer system 700, according to an embodiment of the invention.

The auxiliary modules described herein (e.g., auxiliary modules 202 and 302) may be located in various different physical locations of a vehicle. For example, an auxiliary module having a solar device as the auxiliary power device may be located on a roof of the vehicle, an auxiliary module having a thermal device as the auxiliary power device may be located on a rear chassis of the vehicle, near the exhaust system, and an auxiliary module having a vibrational device as the auxiliary power device may be located on a front chassis of the vehicle, near a suspension system.

In some embodiments, the vehicle 701 is a modular vehicle capable of having various parts of the vehicle exchanged for other parts. These interchangeable parts may be referred to as vehicle modules, vehicle units, or vehicle elements. For example, in modular vehicle 701, the rear top portion 702 of the vehicle 701, which is currently a rear passenger cabin, may be exchanged for a pickup truck flatbed or a van-like cargo transport container. In modular vehicle 701, the rear chassis 708 of the vehicle 701, which is currently a sedan rear chassis, may be exchanged for a heavier-duty van rear chassis or a lighter weight sports car rear chassis. In modular vehicle 701, the front chassis 710 of the vehicle 701, which is currently a sedan front chassis, may be exchanged for a heavier-duty truck front chassis or a lighter weight sports car front chassis.

A solar device 712 is located on the roof of the vehicle 701. A solar device 712A may be part of the rear top portion 702 of the vehicle 701. A solar device 712B may be part of the cockpit module 704. A deformational device 714 is located on a chassis of the vehicle 701. The deformational device 714A may be located on a rear chassis 708. The deformational device 71413 may be located on a front chassis 710. A thermal device 716 may be a part of the rear chassis 708 of the vehicle 701. A vibrational device 718 may be located on the front chassis 710 of the vehicle 701.

The auxiliary modules located in the various vehicle modules of the modular vehicle 701 may power an auxiliary battery located in the respective vehicle module or a vehicle load device located in the vehicle module. Alternatively, or in addition, the auxiliary modules in the modular vehicle 701 may transmit power to a main battery to power a motor 720. Since the electrical energy is transferred wirelessly, the transmission from an auxiliary module or an auxiliary battery to a main battery is established without having to connect physical wires when interchanging one vehicle module for another. The power transmission from the auxiliary module being wirelessly performed contributes to the convenience of exchanging various vehicle modules of the modular vehicle 701. The physical power transmission infrastructure required in the modular vehicle 701 may be minimized.

When a power bus (e.g., power bus 130) is used in the modular vehicle 701, various segments of the power bus may be located within various vehicle modules and connected wirelessly to establish the transfer of power across the vehicle 701. Alternatively, in some embodiments, the various segments of the power bus are connected across vehicle modules using wires.

Figure 8:
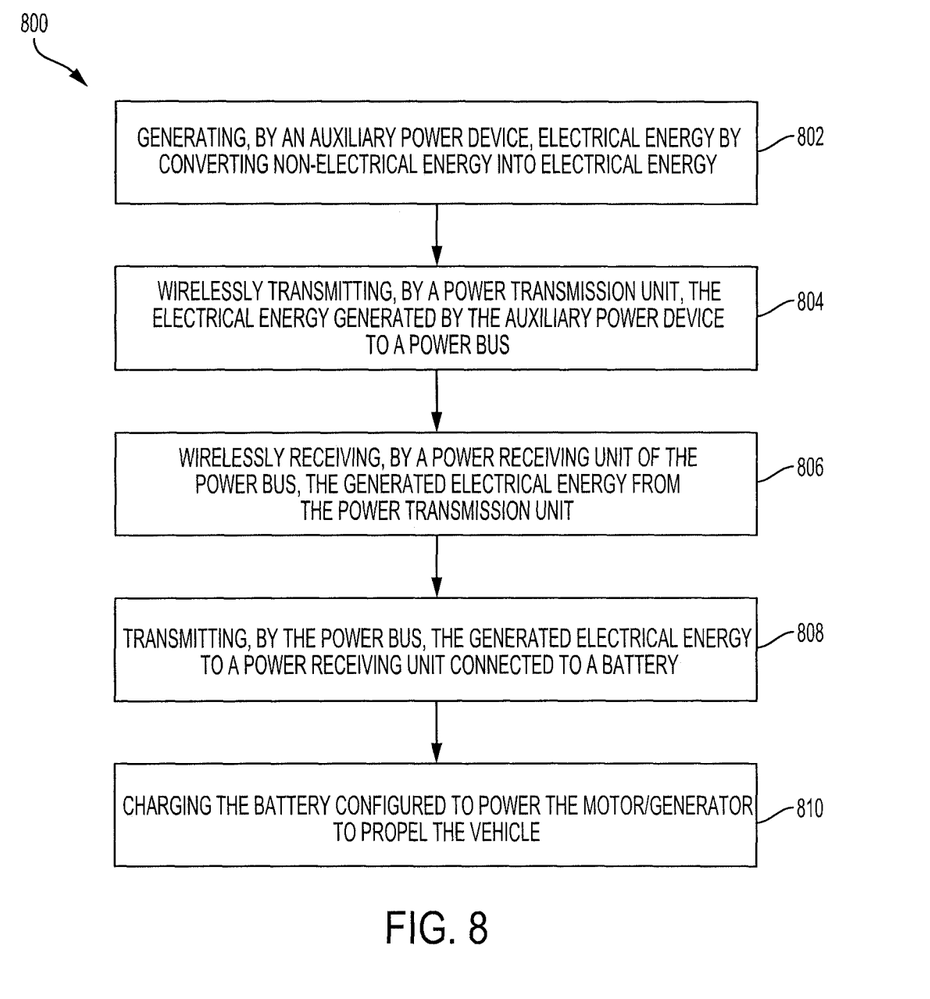
FIG. 8 is a flow diagram of an example process of the system, according to an embodiment of the invention.

FIG. 8 is a flow diagram of an example process 800 of the system, according to embodiments of the invention.

An auxiliary power device 204 of an auxiliary module 202 generates electrical energy by converting non-electrical energy into electrical energy (step 802). For example, the auxiliary power device 204 may be a solar device 108, a vibrational device 110, a deformational device 112, and/or a thermal device 114, as described herein.

A power transmission unit 208 of the auxiliary module 202 wirelessly transmits the generated electrical energy to a power bus 130 (step 804). The power bus 130 is configured to route power (e.g., electrical energy) from one location to another. The power bus 130 may be managed by one or more ECUs, as described herein. The power bus 130 may be made from one or more conductive elements, such as a conductive bar or a conductive wire or cable.

The power bus 130 wirelessly receives, by a power receiving unit 304, the generated electrical energy from the power transmission unit 208 of the auxiliary module 202 (step 806).

The power bus 130 transmits the generated electrical energy to a battery module 210 via a power transmission/receiving unit 310 connected to the power bus 130 and a power receiving unit 216 of the battery module 210 (step 808). The battery module 210 includes a battery 212, which is charged by the electrical energy received from the power bus 130 (step 810). The battery 212 may be used to power a motor/generator or any number of various devices of the vehicle 102.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for generating and storing electrical energy for a partially or fully electric vehicle having a motor/generator, the system comprising:
   a shock absorber of the vehicle configured to absorb or dampen shock and having a piston moving about a cylinder;
   a triboelectric generator connected to the piston and the cylinder of the shock absorber and configured to generate electrical energy by converting frictional energy into electrical energy;
   a transmitter coupled to the triboelectric generator and configured to wirelessly transmit the electrical energy generated by the triboelectric generator;
   a battery configured to store electrical energy and power the motor/generator to propel the vehicle;
   a first receiver coupled to the battery and configured to receive electrical energy and charge the battery;
   a vehicle load device;
   a second receiver coupled to the vehicle load device and configured to receive electrical energy and provide power to the vehicle load device;
   a power bus configured to wirelessly receive the generated electrical energy from the transmitter; and
   an electronic control unit (ECU) configured to manage routing of the electrical energy of the power bus from the transmitter coupled to the triboelectric generator to the first receiver coupled to the battery and the second receiver coupled to the vehicle load device based on a terrain associated with a location of the vehicle.

2. The system of claim 1, wherein the power bus is further configured to wirelessly transmit the generated electrical energy to the second receiver via a power bus transmitter.

3. The system of claim 1, further comprising one or more additional auxiliary power generators each configured to convert non-electrical energy into electrical energy and coupled to a respective power transmitter configured to wirelessly transmit electrical energy to the power bus, and
   wherein the battery is further charged using the electrical energy from the one or more auxiliary power generators.

4. The system of claim 1, wherein the power bus is further configured to wirelessly transmit the generated electrical energy to the first receiver connected to the battery via a power bus transmitter.

5. The system of claim 1, wherein the vehicle is a modular vehicle comprised of one or more removable and interchangeable vehicle units, and
   wherein the triboelectric generator and the transmitter are part of a front chassis vehicle unit or a rear chassis vehicle unit of the modular vehicle.

6. A system for generating and storing electrical energy for a partially or fully electric vehicle having a motor/generator, the system comprising:

a piezoelectric generator connected to a chassis of the vehicle and configured to generate electrical energy by converting deformation from mechanical stress into electrical energy;

a power transmitter configured to wirelessly transmit the electrical energy generated by the piezoelectric generator;

a battery configured to store electrical energy and power the motor/generator to propel the vehicle;

a first receiver configured to receive electrical energy and charge the battery;

a vehicle load device;

a second receiver coupled to the vehicle load device and configured to receive electrical energy and provide power to the vehicle load device;

a power bus configured to wirelessly receive the generated electrical energy from the transmitter; and an electronic control unit (ECU) configured to manage routing of the electrical energy of the power bus from the power transmitter coupled to the piezoelectric generator to the first receiver coupled to the battery and the second receiver coupled to the vehicle load device based on a terrain associated with a location of the vehicle.

7. The system of claim 6, wherein the power bus is further configured to wirelessly transmit the generated electrical energy to the second receiver via a power bus transmitter.

8. The system of claim 6, further comprising one or more additional auxiliary power generators each configured to convert non-electrical energy into electrical energy and coupled to a respective power transmitter configured to wirelessly transmit electrical energy to the power bus, and wherein the battery is further charged using the electrical energy from the one or more auxiliary power generators.

9. The system of claim 6, wherein the power bus is further configured to wirelessly transmit the generated electrical energy to the first receiver coupled to the battery via a power bus transmitter.

10. The system of claim 6, wherein the vehicle is a modular vehicle comprised of one or more removable and interchangeable vehicle units, and wherein the piezoelectric generator and the transmitter are part of a front chassis vehicle unit or a rear chassis vehicle unit of the modular vehicle.

11. A system for generating and storing electrical energy for a modular vehicle having a motor/generator and one or more removable and interchangeable vehicle units, the system comprising:

a DC power source configured to generate DC electrical energy;

a first power transmitter configured to wirelessly transmit the DC electrical energy generated by the DC power source, the DC power source and the first power transmitter being part of a first chassis vehicle unit of the modular vehicle;

an AC power source configured to generate AC electrical energy;

a second power transmitter configured to wirelessly transmit the AC electrical energy generated by the AC power source, the AC power source and the second power transmitter being part of a second chassis vehicle unit of the modular vehicle;

a battery configured to store electrical energy and power the motor/generator to propel the vehicle;

a first receiver configured to receive the DC electrical energy from the first power transmitter or the AC electrical energy from the second power transmitter and charge the battery;

a vehicle load device; and a second receiver coupled to the vehicle load device and configured to receive the DC electrical energy from the first power transmitter or the AC electrical energy from the second power transmitter and provide power to the vehicle load device.

12. The system of claim 11, wherein the DC power source is at least one of a solar device configured to convert solar energy into electrical energy or a thermal device configured to convert heat into electrical energy.

13. The system of claim 11, wherein the AC power source is at least one of a triboelectric generator configured to convert vibrational energy into electrical energy or a piezoelectric generator configured to convert deformation from mechanical stress into electrical energy.

14. The system of claim 11, further comprising an electronic control unit (ECU) configured to manage routing of the electrical energy between the first power transmitter, the second power transmitter, the first receiver, and the second receiver based on a terrain associated with a location of the vehicle.

* * * * *